United States Patent [19]

Chapman et al.

[11] 4,229,421
[45] Oct. 21, 1980

[54] PURIFICATION OF PLUTONIUM

[75] Inventors: Edward S. Chapman; William Smith, both of Whitehaven, England

[73] Assignee: British Nuclear Fuels Limited, Cheshire, England

[21] Appl. No.: 940,010

[22] Filed: Sep. 6, 1978

[30] Foreign Application Priority Data

Sep. 16, 1977 [GB] United Kingdom ............... 38786/77

[51] Int. Cl.² ............................................. C01G 56/00
[52] U.S. Cl. ..................................... 423/10; 423/250; 423/251
[58] Field of Search .......................... 423/10, 250, 251

[56] References Cited

U.S. PATENT DOCUMENTS

| | | | |
|---|---|---|---|
| 3,374,068 | 3/1968 | Erlandson et al. | 423/251 |
| 3,714,324 | 1/1973 | Weech | 423/10 |
| 3,787,553 | 1/1974 | Espie et al. | 423/250 |
| 3,962,401 | 6/1976 | Tsuboya et al. | 423/250 |
| 3,981,961 | 9/1976 | Bathellier et al. | 423/10 |
| 4,011,296 | 3/1977 | Ruiz et al. | 423/10 |
| 4,131,527 | 12/1978 | Friedman et al. | 423/10 |

FOREIGN PATENT DOCUMENTS 2460145  6/1976  Fed. Rep. of Germany ............. 423/10

Primary Examiner—Edward A. Miller
Attorney, Agent, or Firm—Larson, Taylor and Hinds

[57] ABSTRACT

During the reprocessing of irradiated nuclear fuel by solvent extraction techniques a primary separation to give a uranium containing product stream and a plutonium containing product stream occurs. The plutonium in the plutonium containing stream is separated from neptunium and uranium by bringing a solution containing plutonium, neptunium and uranium in an organic solvent into contact first with an aqueous solution of a hydroxylamine and/or a hydrazine salt at 30° to 35° C. to preferentially reduce the neptunium and to extract it into the aqueous phase and then bringing the organic solution containing plutonium and uranium into contact with an aqueous phase containing a hydroxylamine and a hydrazine salt at about 50° C. to preferentially reduce the plutonium and to extract it into the aqueous phase leaving the uranium in the organic solvent.

1 Claim, 2 Drawing Figures

PURIFICATION OF PLUTONIUM

BACKGROUND OF THE INVENTION

The present invention relates to the purification of plutonium which is separated from fission products and from uranium during the reprocessing of irradiated nuclear fuel.

In one process for the reprocessing of irradiated nuclear fuel the nuclear fuel material and fission products are dissolved in nitric acid and the resulting solution is passed to a solvent extraction column where it is brought into contact with a solution of tributyl phosphate in kerosene. The extractable species which include plutonium, uranium and neptunium values pass into the organic phase leaving the bulk of the highly radioactive fission products in the aqueous phase. The organic phase is then passed to a further solvent extraction column where it is brought into contact with an aqueous solution of a reducing agent such as tetravalent uranium which is capable of reducing tetravalent plutonium to the trivalent state. Trivalent plutonium passes into the aqueous phase along with some uranium and neptunium and other impurities. The uranium present is not reduced by the reducing agent and the major proportion of it remains in the organic phase. Following this primary separation of the uranium-containing organic phase and the plutonium-containing aqueous phase, further purification is required to isolate the uranium and plutonium in a suitable form for re-using as fuel for a nuclear reactor. It is the further purification of the plutonium-containing aqueous phase to which the present invention relates.

SUMMARY OF THE INVENTION

According to the present invention a process for the purification of a plutonium-containing aqueous phase during the reprocessing of irradiated nuclear fuel in which the aqueous phase also contains some uranium and neptunium includes the steps of bringing the plutonium-containing aqueous phase into contact with an organic solvent, which solvent comprises a solution of an alkyl ester of phosphoric acid in an organic diluent, to extract plutonium, uranium and neptunium into solution in the organic solvent, bringing the organic solution into contact with a first aqueous phase containing a reductant for neptunium selected from the group consisting of hydroxylamine salts, hydrazine salts and mixtures of hydroxylamine and hydrazine salts at about 30° to 35° C. to extract neptunium into the aqueous phase, separating the organic solution from the aqueous phase, bringing the organic solution into contact with a further aqueous phase containing a reductant for plutonium selected from the group consisting of hydroxylamine salts, hydrazine salts and mixtures of hydroxylamine and hydrazine salts at about 50° C. to extract plutonium into the further aqueous phase and separating the organic solvent from the further aqueous phase.

The present invention is based on the applicants discovery that contacting an organic solution containing plutonium, uranium and neptunium with a first aqueous phase containing a hydroxylamine and/or hydrazine salt at a temperature in the range 30°–35° C. reduces hexavalent neptunium to the pentavalent state which is termed in the art inextractable and so passes into the aqueous phase. Under the conditions used the reduction of tetravalent plutonium to the trivalent form is very slow and the plutonium remains in the organic solution in the extractable tetravalent state. However at around 50° the reduction of tetravalent plutonium by the hydroxylamine and/or hydrazine salts proceeds more rapidly so that when the organic solution is treated with the further aqueous solution at around 50° C. reduction of tetravalent plutonium to the inextractable trivalent state occurs and the trivalent plutonium passes into the further aqueous phase. The hexavalent uranium is not reduced and remains in the organic solvent.

DESCRIPTION OF THE DRAWINGS

The invention will be illustrated by the following description given by way of example only of the purification of an aqueous solution of plutonium which also contains uranium and neptunium resulting from the primary separation of uranium and plutonium during the reprocessing or irradiated nuclear fuel elements. The description has reference to the accompanying drawings in which.

DESCRIPTION OF THE PREFERRED EMBODIMENTS

Figure 1:
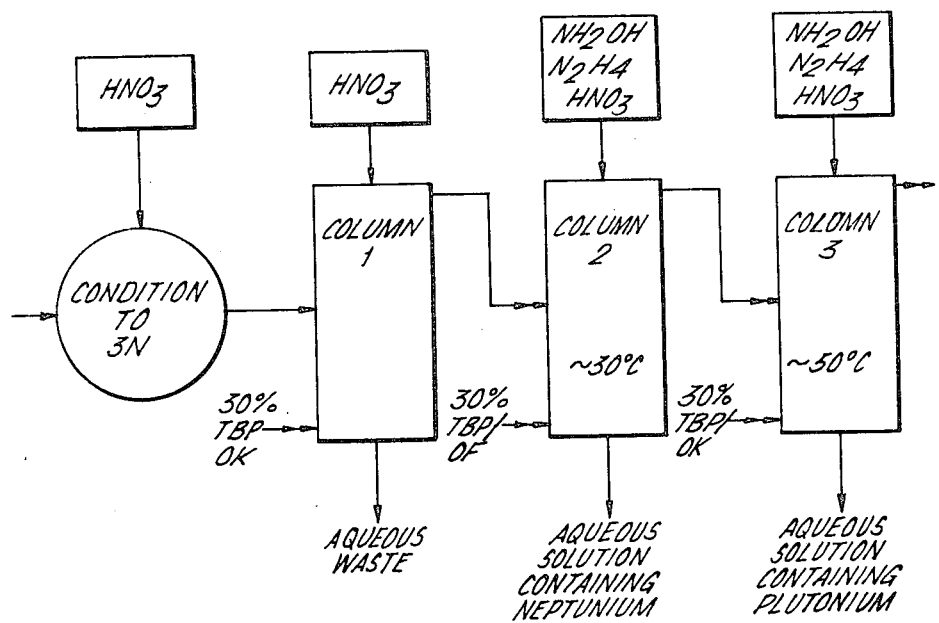
FIG. 1 is a diagrammatic flow-sheet showing a first plutonium purification process.

In the first process shown in FIG. 1 the aqueous plutonium-containing solution from the primary separation is conditioned so that it is 3 N in nitric acid by the addition of 12 N nitric acid and so that the plutonium present is in the tetravalent state. The conditioned solution is then fed to a central portion of a solvent extraction column 1 where it is brought into contact with a 30% solution of tributyl phosphate in kerosene (shown on the flowsheet as 30% TBP/OK) so that the extractable species such as those containing plutonium, uranium and neptunium are extracted into the organic phase. A scrub solution of nitric acid is introduced into the top of column 1.

The organic extract from column 1 is introduced into a central portion of a further solvent extraction column 2 operating at 30° C. A 30% solution of tributylphosphate in kerosene is passed up the column and a scrub solution containing hydroxylamine and hydrazine nitrates in nitric acid introduced at the top of the column. The reducing agents in the aqueous scrub solution cause reduction of hexavalent neptunium to the pentavalent state which passes into the aqueous phase and is removed at the foot of the column. The organic phase leaving the top of column 2 contains plutonium in the tetravalent state (which is not reduced at a significant rate at 30° C. under the conditions existing in column 2) and uranium.

The solvent phase leaving column 2 is passed to a central portion of a third solvent extraction column operating at 50° C. where it is contacted by a 30% solution of tributyl phosphate in kerosene. A further scrub solution containing hydroxylamine and hydrazine nitrates in nitric acid is introduced at the top of the column. The reducing agents in the further scrub solution cause reduction of the tetravalent plutonium to the trivalent states which passes into the aqueous phase which is removed at the foot of the column and is then further purified to give the desired plutonium product. Hexavalent uranium is not reduced and remains in the organic phase.

Figure 2:
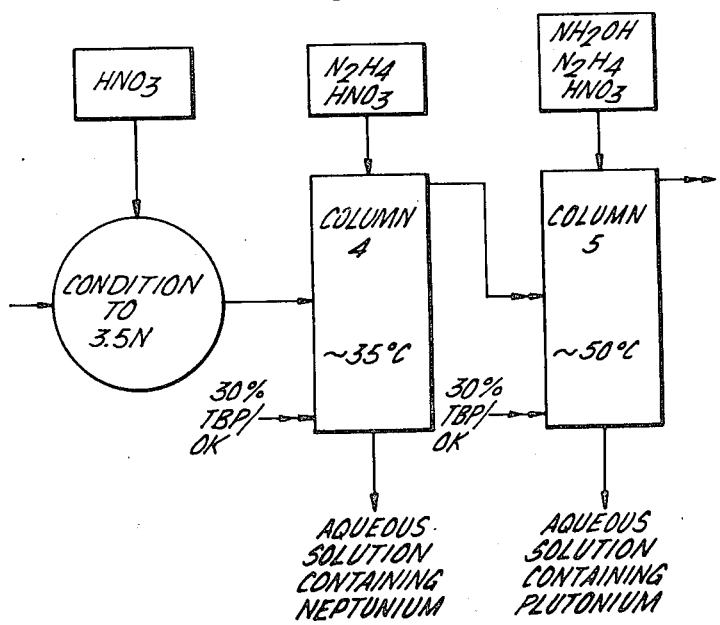
FIG. 2 is a diagrammatic flow-sheet showing an alternative plutonium purification process.

In the alternative process shown in FIG. 2 the aqueous plutonium containing solution from the primary separation undergoes a first cycle of a purification in which it is first extracted into a 30% solution of tributyl phosphate in kerosene and then backwashed into an aqueous solution using an acidic solution of hydroxylamine and hydrazine nitrates. The extraction and backwash is effected in columns operating at 45° C. The aqueous solution leaving the first cycle of purification is then conditioned so that it is 3.5 N in acid and so that the plutonium present is in the tetravalent state. The conditioned solution is cooled to 35° C. The cooled aqueous solution is then introduced into a central portion of a solvent extraction column 4 operating at 35° C. and brought into contact with a 30% solution of tributyl phosphate in kerosene which extracts the extractable species. A scrub solution containing hydrazine in nitric acid is introduced at the top of the column 4 and causes reduction of hexavalent neptunium to the pentavalent state. Pentavalent neptunium passes into the aqueous phase and is removed at the base of the column. The plutonium-containing organic phase is introduced into a central portion of a solvent extraction column 5 operating at 50° C. where it is contacted with a 30% solution of tributylphosphate in kerosene and is scrubbed with an aqueous solution containing hydroxylamine and hydrazine nitrates in nitric acid. Reduction of tetravalent plutonium to the trivalent state occurs and the trivalent plutonium passes into the aqueous phase which is collected at the foot of the column.

We claim:

1. A process for the purification of a plutonium-containing aqueous phase during the reprocessing of irradiated nuclear fuel in which the aqueous phase also contains some uranium and neptunium includes the steps of bringing the plutonium-containing aqueous phase into contact with an organic solvent, which solvent comprises a solution of an alkyl ester of phosphoric acid in an organic diluent, to extract plutonium, uranium and neptunium into solution in the organic solvent, bringing the organic solution into contact with a first aqueous phase containing a reductant for neptunium selected from the group consisting of hydroxylamine salts, hydrazine salts and mixtures of hydroxylamine and hydrazine salts at about 30° to 35° C. to extract neptunium into the aqueous phase, separating the organic solution from the aqueous phase, bringing the organic solution into contact with a further aqueous phase containing a reductant for plutonium selected from the group consisting of hydroxylamine salts, hydrazine salts and mixtures of hydroxylamine and hydrazine salts at about 50° C. to extract plutonium into the further aqueous phase and separating the organic solvent from the further aqueous phase.

* * * * *